Aug. 2, 1960
S. A. CROSBY
2,947,535
MOUNTING FOR BEARING ELEMENTS
Filed May 7, 1956
3 Sheets-Sheet 1
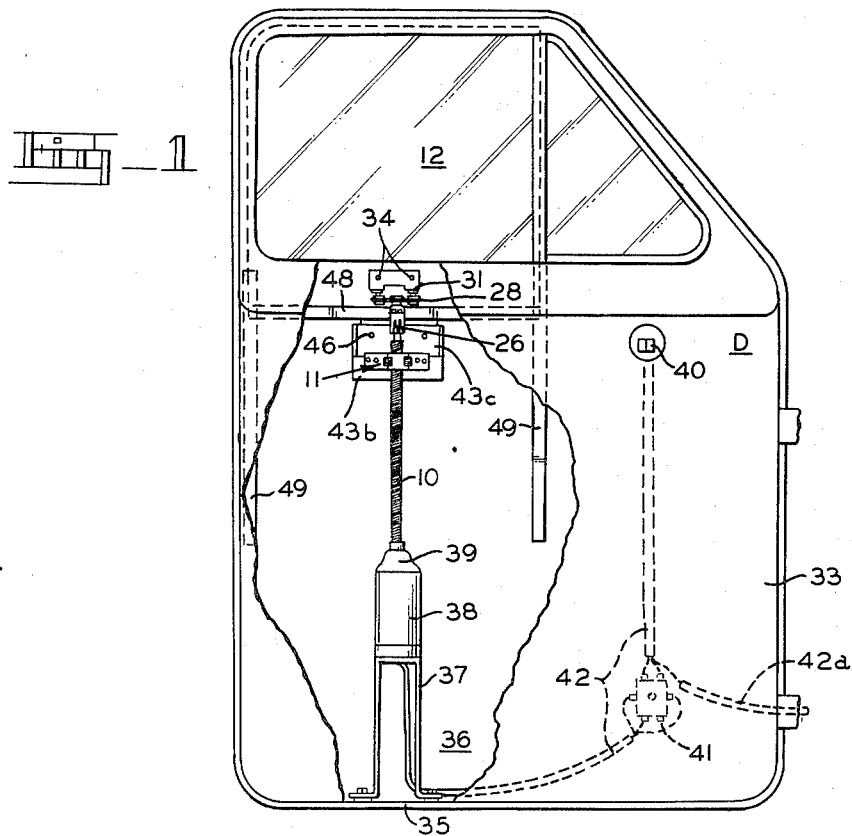
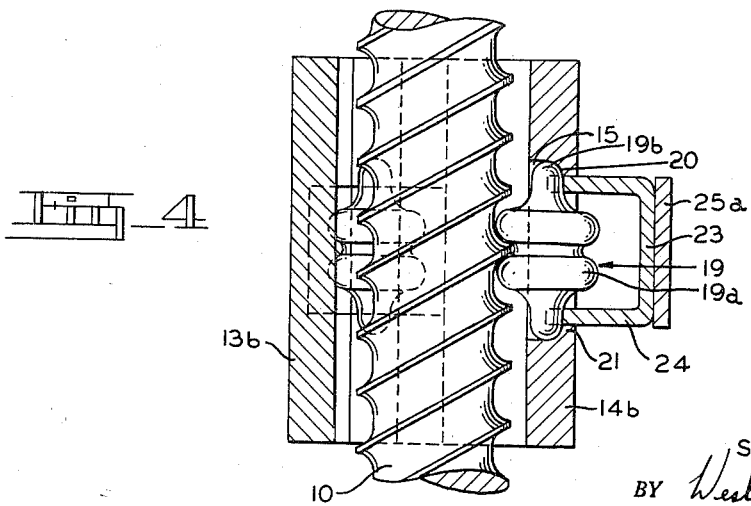
INVENTOR
STEPHEN A. CROSBY
BY *Wesley B. Taylor*
ATTORNEY

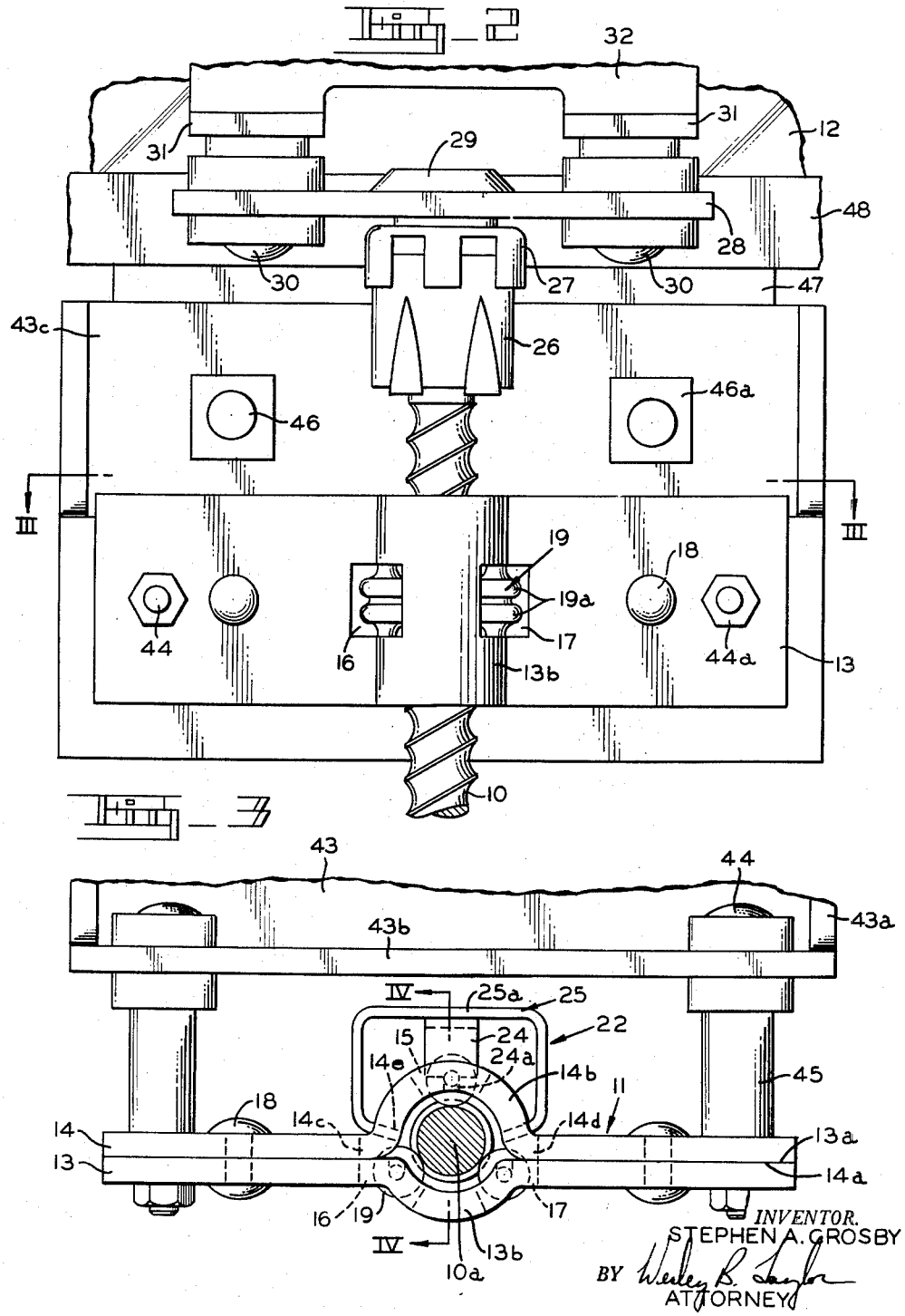

Aug. 2, 1960 S. A. CROSBY 2,947,535
MOUNTING FOR BEARING ELEMENTS
Filed May 7, 1956 3 Sheets-Sheet 3
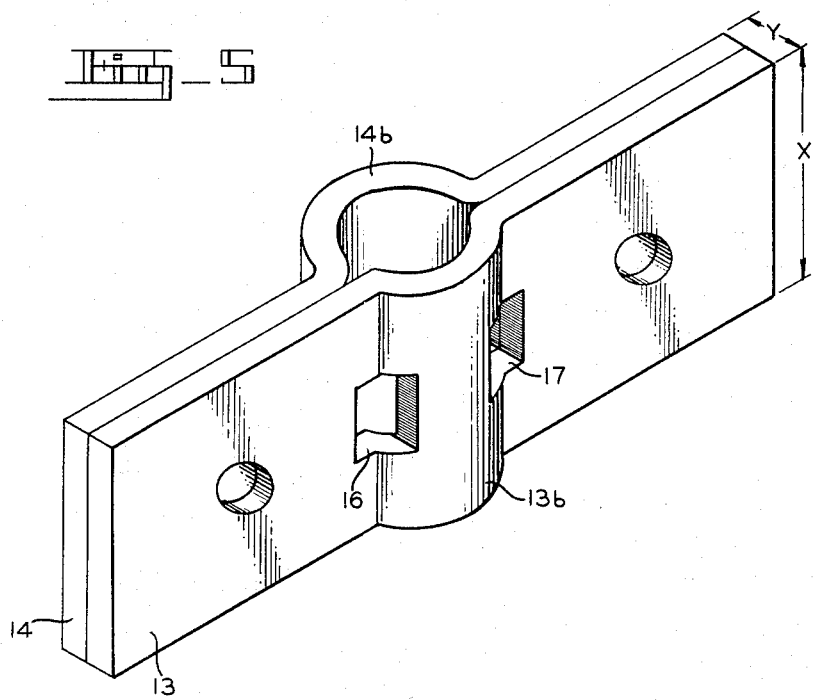
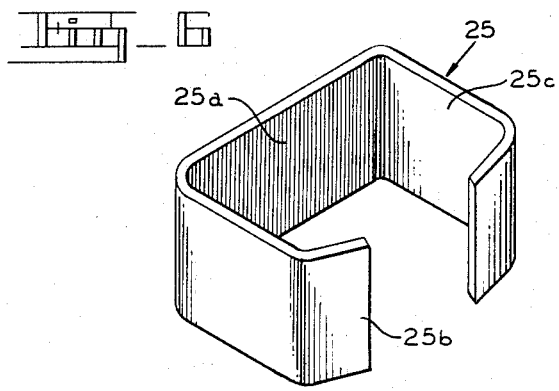
INVENTOR.
STEPHEN A. CROSBY
BY Wesley B. Taylor
ATTORNEY United States Patent Office 2,947,535
Patented Aug. 2, 1960

2,947,535
MOUNTING FOR BEARING ELEMENTS

Stephen A. Crosby, Gary, Ind., assignor to The Anderson Company, a corporation of Indiana Filed May 7, 1956, Ser. No. 583,137

11 Claims. (Cl. 268—124)

The present invention relates to a mounting for rotatable bearing elements and, more particularly, to a nut assembly of improved construction for rotatable bearing elements adapted to engage a helically threaded member.

Previous mountings designed for this general purpose have embodied mounting plates or strips which are disposed radially of a threaded shaft, so that the planes in which the plates lie intersect the axis of the shaft, usually at right angles. The plates are provided with suitably aligned openings to pass the shaft. The bearing elements in these structures extend from one plate to the other and are disposed substantially symmetrically about the shaft and in engagement with a thread of the shaft.

This type of mounting has several disadvantages. For one, when mounting plates are spaced radially of the shaft as mentioned, accurate mounting of the rotatable elements with respect to the shaft and to each other depends on accurate shaping and spacing of the mounting plates relative to each other, since both plates cooperate to support each of the bearing elements. Accordingly, it becomes very difficult on a commercial production basis to maintain the desired spacing and dimensional control on the journaling areas of the plates, in which the rotatable elements are mounted, and also to achieve the proper alignment of the plates within the allowable close tolerances which is necessary for smooth and trouble-free operation. Even a slight lateral movement of one plate relative to the other can offset the journaling areas for the rotatable elements, so that the latter may be undesirably skewed or canted from their intended positions. In the same manner, even though the plates are properly aligned, if a journaling area or recess in one plate is not accurately matched axially of the shaft with a corresponding journaling area in the other plate, one rotatable element may be skewed or canted to the exclusion of the others or more so than the others. In any case, the resulting spacial arrangement of the rotatable elements introduces undesirable rattling of the elements and, more importantly, adversely effects smooth and efficient rolling engagement of a nut assembly embodying such rotatable elements with a threaded shaft.

Additionally, as a mounting axially travels a threaded shaft, most if not all of the forces acting on the mounting are exerted in directions substantially parallel to the axis of the shaft. When the forces act to pull the plates apart, the fasteners holding the mounting plates together are placed in tension which usually does not represent the strongest resistance of the fastener to fracture. For instance, when the fastener is a rivet, only the staked end portion or head of the rivet need be ruptured when the rivet is tested in tension to loosen the connection between the mounting plates.

Still further, when a mounting plate of the prior types is placed radially of a shaft so as to intersect the axis as described, only the thickness of the plate is available to resist a bending moment applied axially along the shaft, and it is, as indicated, this direction in which the force of loads and the like are customarily applied. The thickness of a mounting plate, being the smallest of the plate dimensions, provides the weakest resistance to bending. Consequently, such prior mounting plates do not rigidly resist axially applied loads, but tend to flex, first in one direction and then in the other, about a transverse axis paralleling a major face of the plate as the application of a load reverses.

The present mounting obviates the foregoing faults. The mounting plate of the present invention can be manufactured by a stamping operation and still maintain the relatively precise dimensions within the close tolerances desired for accurately mounting rotatable elements relative to the shaft and to each other. The elements are substantially rattle-free in their mountings. Moreover, fasteners securing the mounting plates together are subjected to a shear stress rather than a tensional pull to provide a stronger structure. Additionally, the mounting plates of the present invention resist a bending moment applied axially along a shaft by the width of a plate to afford a more rigid assembly.

In one form, for example, the mounting includes a pair of plates or strips which are placed generally parallel to the longitudinal axis of a shaft. Each plate has an arcuate portion complementing a corresponding portion in the other plate to define an opening which receives the shaft. The arcuate portions of the plates have recesses and a bearing element is mounted for rotation in each of the recesses. Fasteners such as rivets secure abutting planar surfaces of the mounting plates. Since each plate individually carries one or more rotatable bearing elements and need not cooperate with a companion plate to provide journalling means for such elements, the journalling means may be accurately and simply formed in the plate by a method which is economic and conducive to mass production, such as a stamping operation. Also, since the fasteners securing the plates are angularly disposed with respect to the axis of the shaft, the fasteners are subjected to shear in resisting axially directed loads in which they are ordinarily stronger than in tension. Further, because of the parallel disposition of the plates to the shaft, a bending moment applied along the shaft is resisted by the width or axial extent of each plate to provide a much more rigid structure.

In the preferred form, rotatable bearing elements having toroidal surfaces are used to provide substantially a point-to-point contact with a thread of the shaft, and spring means urges the rotatable elements against the thread of the shaft.

The accompanying drawings illustrate a presently preferred embodiment wherein:

Figure 1 is an elevational view, partially broken away, of an inner side of a vehicle door and shows the application of the present invention to a window lift;

Figure 2 is a greatly enlarged portion of Figure 1 and illustrates a nut assembly embodying the present mounting plates or strips;

Figure 3 is a section of Figure 2 on the line III—III;

Figure 4 is a section of Figure 3 on the line IV—IV;

Figure 5 is an isometric, diagrammatic view of the mounting plates when placed together; and Figure 6 is an isometric, diagrammatic view of a resilient band which may be used in the nut assembly to urge rotatable elements into engagement with a shaft.

The invention is disclosed as a cooperating member of a combination of driving and driven elements in which a helically threaded shaft constitutes the other member. Either member may be the driven member. Further, the driving member may itself be actuated by rotary motion to impart translatory motion to the driven member; or the driving member may be thrust in a linear direction by translatory motion to impart rotary motion to the driven member.

In the embodiment illustrated, a rotated, helically threaded shaft 10 drives the present nut assembly, generally indicated at 11, in a translatory direction or axially of the shaft 10 to regulate the position of a window 12. More particularly, the nut assembly includes a pair of mounting plates or strips 13 and 14 which generally parallel the longitudinal axis of the shaft 10. The plates have substantially planar abutting surfaces 13a and 14a at their ends and oppositely curved medial portions 13b and 14b which together define a circular passage exceeding the diameter of the shaft 10 for reception thereof. The plates have elongate recesses or openings extending axially of the shaft in which to mount rotatable bearing elements. Plate 14 has a single opening 15 disposed substantially centrally of its curved portion 14b. In order to station the bearing elements substantially symmetrically about the shaft 10, plate 13 has two elongate openings 16 and 17 at the intersection of its curved portion 13b with its planar surfaces 13a. Because of this stabilizing disposition of the bearing elements, the longitudinal axis 10a of the shaft lies within the curved medial portion 14b of plate 14 as shown in Figure 3, or inwardly from the abutting planar surface 14a of that plate. This may be readily accomplished by providing curved portion 14b with a longer arcuate extent than curved portion 13b. Accordingly, to accommodate the rotatable elements mounted in the openings 16 and 17, it may be necessary to provide clearance openings 14c and 14d in plate 14 where the curved portion 14b intersects the planar surfaces 14a. Suitable fasteners such as rivets 18 secure the plates 13 and 14 together through aligned apertures.

Bearing elements rotatably carried in the openings or recesses 15, 16, and 17 make rolling engagement with the thread of the shaft 10. Preferably, elongate bearing elements are used because they stabilize the nut assembly relative to the shaft. For example, elongate bearing elements 19 may be used and provided with a thread-engaging portion or unit 19a to contact the thread of the shaft. In the preferred form, the unit 19a has a toroidally curved outer radial exterior. By "toroidal" or "toroid" as used herein is meant a contacting surface generated by the revolution of a section line cut from a cone, by a plane passing through the cone, about an axis lying in the plane of the section. A toroidal bearing surface has been found to provide a highly desirable substantially point-to-point engagement with a thread of the shaft 10. It is also preferred to use a plurality of the thread-engaging means 19a toroidal or otherwise, which are spaced axially of the elongate bearing element and engage opposite sides of the thread as shown in Figure 4. The axial extent of the bearing element between the bearing surfaces serves to bridge or straddle the crown of the thread and is closely spaced therefrom. A roller or bearing element having a plurality of axially spaced bearing surfaces 19a provides a groove which prevents ironing out of the edge of the thread to a thin or razor-edge condition. Instead, the use of a plurality of bearing surfaces tends to hold the thread in a thicker and stronger formation and further to resist an axial thrust in either direction.

In any case, the openings or recesses 15, 16, and 17 in the plates 13 and 14 have lengths substantially matching the lengths of the elongate rotatable elements 19 to mount accurately the bearing elements in the mounting strips relative to the shaft 10 and to each other within close dimensional tolerances and in a substantially rattle-free condition. Thus, trunnion or pintle ends 19b of the elements 19 abut the walls of the openings or recesses 15, 16, and 17, the lengths of the openings being closely controlled by a stamping or similar operation.

The openings or recesses are also preferably provided with suitable journaling means for the rotatable elements 19. In the embodiment illustrated, the journaling means takes the form of shoulders 20 formed by opposed lips 21 (Figure 4) which extend toward one another and against which the trunnions 19b seat. In this manner, the lips 21 also arrest the outward radial movement of the bearing elements 19 from the shaft 10. With this structure, therefore, it is not critical that the ends of the bearing elements closely abut against the opposing ends or walls of the recesses, although as small a clearance as possible between the tips of the trunnion 19b and such ends of the recesses is desired to obtain an accurate and rattle-free mounting.

In the illustrated form of the invention, the lips 21 are sufficiently stationed away from the shaft 10 to permit some radial movement of the elements 19 toward and away from the shaft 10. Suitable spring means generally indicated at 22 urges one of the elements 19 toward the shaft 10 and thereby automatically compensates for any slack in a general radial direction of any of the elements. The spring means includes a U-shaped clip 23 having leg portions 24 provided with slots 24a to rotatably receive the trunnions 19b of the rotatable elements. A resilient band 25, also generally U-shaped, has its bight portion 25a contacting and preferably secured to the medial part of the clip 23. The ends 25b of the band fit into slots 14e in the curved portion 14b of plate 14 as shown in Figure 3. The ends 25b are normally at right angles to the sides 25c of the U-shaped band as illustrated in Figure 6. Accordingly, when the ends are extended to the angular position of Figure 3, the band 25 presses the rotatable element 19 engaged by the clip 23 toward the shaft 10 and thereby serves to urge all of the rotatable elements into a rolling engagement with the shaft.

The shaft 10 is suitably journaled for rotation and for driving. For example, a bearing cup 26 and cover 27 fixed to the upper end of the shaft pivot relative to a strip 28 about a pin 29 which is suitably retained within the cup 26 against axial displacement. Rivets 30 attach the strip 28 to flange portions 31 of a plate 32. The inner panel 33 of a vehicle door D supports the plate 32 by fasteners 34 and has an outwardly turned ledge 35 along its bottom which attaches to an outer panel 36 of the door. A bracket 37 secured to the ledge 35 carries a reversible motor 38, the output shaft of which (not shown) conventionally drives the shaft 10 through a bearing 39. A reversible switch 40 and control 41 energize the motor 38 through conductors 42 to drive the motor in either direction in a known manner. Conductor 42a extends through a hinge of the door to the car battery.

A U-shaped bracket 43 having reinforcing sides 43a joins the mounting 11 to the window 12. Bolts 44, nuts 44a, and tubular spacers 45 fix the mounting 11 with respect to a forward plate 43b of the bracket, while bolts 46 and nuts 46a secure a rearward plate 43c of the bracket to a supporting strip 47. This strip is fixed to a channel 48 which receives the lower edge of the window 12.

To assemble the present mounting, the plates are suitably secured together and the rotatable elements 19 then placed within the recesses 15, 16, and 17. While the elements are held in position from one end, the shaft 10 may be screwed through the circular opening defined by the plates through the other end so as to engage the rotatable elements and hold them in place. The clip 23 and band 25 may then be installed to urge the rotatable elements against the shaft as described.

After installation, as the motor 38 rotates the shaft 10, the nut assembly 11 travels the shaft to raise or lower the window 12 in channel guides 49. The bearing elements 19 cannot become misaligned relative to the shaft or each other since the positioning of each element depends on the dimensions of an individual plate, which can be accurately controlled, and does not depend on a precise co-spacing or cooperation of the plates 13 and 14. The rivets 18 are tested in shear by axial loads rather than in tension. Additionally, the entire width or axial extent "X" of the mounting plates 13 and 14 resists an axially directed bending moment rather than the thickness "Y" to provide a more rigid and stronger structure.

Although the foregoing disclosure describes a presently preferred embodiment, it is understood that the invention may be practiced in still other forms within the scope of the following claims.

I claim:

1. A nut assembly for a helically threaded shaft including a pair of mounting plates generally paralleling the longitudinal axis of the shaft, each plate having an arcuate portion complementing a corresponding portion in the other plate to define a circular opening exceeding the diameter of the shaft to pass the shaft therethrough, means securing the plates together, said arcuate portions being formed with elongate recesses extending parallel with the axis of the shaft, elongate bearing elements for engaging the threads of said shaft, each element being positioned for rotation in one of said recesses, the bearing elements having axle portions at either end, and the ends of each of said recesses including bearing portions for said axle portions receiving the axial and the radially outward thrusts of said bearing elements and accurately mounting the bearing elements axially of the threaded shaft and to each other.

2. An assembly as claimed in claim 1 wherein the thread-engaging portion of an elongate bearing element is a radially enlarged toroidal bearing surface to make substantially a point-to-point contact with a side of the thread with only the axle portions thereof contacting the mounting plates.

3. In combination, driving and driven members, one of said members comprising a helically threaded shaft, the other of said members comprising a nut assembly adapted to engage the shaft for relative axial travel, said assembly comprising a pair of mounting plates generally paralleling the longitudinal axis of the shaft and having matching arcuate portions to define a passage for the shaft, said arcuate portions having elongate openings disposed axially in relation to the shaft, each opening having journaling means adjacent each extremity thereof, an elongate bearing element mounted for rotation in each of the openings and having end portions engaging said journalling means to provide accurate and substantially rattle-free mounting of the bearing elements, and means to secure the mounting plates together, said bearing elements having a thread-engaging portion to contact a side of a thread of the shaft whereby rotary movement of the shaft provides translatory movement of the nut assembly.

4. In combination, driving and driven members, one of said members comprising a helically threaded shaft, the other of said members comprising a nut assembly adapted to engage the shaft for relative axial travel, said assembly comprising a pair of mounting strips generally paralleling the longitudinal axis of the shaft and having substantially planar abutting surfaces provided with oppositely curved medial portions to define a circular passage for the threaded shaft, one strip having openings at the intersections of its curved portion with its planar surface, the other strip having an opening within its curved portion, said openings being elongate in a direction substantially paralleling the longitudinal axis of the shaft and having shoulder portions at the opposite extremities thereof, an elongate bearing element mounted for rotation in each of the openings and having trunnion portions seated against said shoulder portions to provide accurate mounting of the bearing elements relative to the shaft and to each other, means to secure the strips together, said bearing elements having a thread-engaging unit to contact a side of the thread of the shaft whereby rotary movement of the shaft provides translatory movement of the nut assembly.

5. In combination, driving and driven members, one of said members comprising a helically threaded shaft, the other of said members comprising a nut assembly adapted to engage the shaft for relative axial travel, said assembly comprising a pair of mounting plates generally paralleling the longitudinal axis of the shaft and having substantially planar end abutting surfaces provided with oppositely curved medial portions to define a circular passage for the threaded shaft, one plate having openings at the intersections of its curved portion with its planar surface, the other plate having an opening within its curved portion, said openings being elongate in a direction substantially paralleling the longitudinal axis of the shaft, a rotatable thread-engaging element disposed within each opening and having a length substantially matching the length of the opening to provide accurate positioning of the rotatable elements relative to the threaded shaft and to each other within close dimensional tolerances provided by each mounting plate independently of the other, limiting means for each opening to arrest the outward radial movement of each thread-engaging element from the threaded shaft, means to secure the plates together, and spring means carried by one of the plates to urge the bearing elements into engagement with the threaded shaft.

6. Driving and driven members as claimed in claim 5 wherein said spring means comprises a clip freely receiving a bearing element and resilient means supported by one of the plates for pressing the clip radially inwardly toward the shaft to urge the bearing element into rolling frictional engagement with the helically threaded shaft.

7. A window regulator including a rotatable threaded shaft, a nut assembly engaging the shaft for axial travel therealong and a window joined to the nut assembly and positioned in accordance with said axial travel of the assembly, said assembly comprising a pair of mounting plates generally paralleling the longitudinal axis of the shaft and having substantially planar abutting surfaces provided with oppositely curved medial portions to define a circular passage for the threaded shaft, the center of said circular passage lying within the curved medial portion of one plate, said one plate having an opening substantially centrally disposed of its curved portion, the other plate having openings at the intersections of its curved portion and its planar surface, all of said openings being elongate in a direction substantially paralleling the longitudinal axis of the shaft, a thread-engaging element disposed within each opening and having a length substantially matching the length of the opening to provide an accurate positioning of the thread-engaging element relative to the shaft which is determined solely by each plate individually and not in cooperation with each other, means in each opening for simultaneously journaling each thread-engaging element for rotation and for limiting the outward radial movement of said element from the threaded shaft, means to secure the mounting plates together, and means to urge the thread-engaging elements into engagement with the shaft comprising a clip freely and rotatably receiving the element journaled in said one plate and a resilient band having a medial portion contacting the clip and its ends attached to said one plate to urge the clip and element radially inwardly toward the threaded shaft.

8. A mounting for elongate rotatable bearing elements adapted to engage a helically threaded member for relative axial travel therewith, including a tubular nut portion having circumferentially spaced elongate recesses extending axially thereof for receiving said elements, a generally U-shaped spring element exteriorly of said nut portion and having the free ends of its legs embracing said nut portion, and elements extending from the bight of said spring element into said nut portion and engaging the end portions of one of said bearing elements for biasing the same radially inward.

9. A mounting for elongate rotatable bearing elements adapted to engage a helically threaded member for relative axial travel therewith, including a tubular nut portion having circumferentially spaced elongate recesses extending axially thereof for receiving said elements, a generally U-shaped spring element exteriorly of said nut portion and having the free ends of its legs turned inwardly and extending into spaced openings formed in said nut portion, and elements extending from the bight of said spring element into said nut portion and engaging the end portions of one of said bearing elements for biasing the same radially inward.

10. A mounting for elongate rotatable bearing elements adapted to engage a helically threaded member for relative axial travel therewith, including a tubular nut portion having circumferentially spaced elongate recesses extending axially thereof for receiving said elements, at least one generally U-shaped spring element having the free ends of its legs turned inwardly and extending into spaced openings formed in said nut portion, and a clip carried by the bight of said spring element and having legs extending into said nut portion and engaging the end portions of one of said bearing elements for biasing the same radially inward.

11. The structure as defined in claim 10 wherein the clip is of U-shape with its bight disposed transverse to the bight of the U-shaped element.

References Cited in the file of this patent
UNITED STATES PATENTS

| | | |
|---|---|---|
| 1,827,968 | Bryant | Oct. 20, 1931 |
| 2,236,492 | Costello | Mar. 25, 1941 |
| 2,714,005 | Wise | July 26, 1955 |